Nov. 1, 1960  W. C. JOHNSON ET AL  2,958,857
MULTI-SIGNAL SAMPLING CIRCUIT
Filed Jan. 31, 1958  3 Sheets-Sheet 1

INVENTORS
WALTER C. JOHNSON
JOHN F. BRINSTER
BY
Ralph K. Bonell
AGENT

Nov. 1, 1960 W. C. JOHNSON ET AL 2,958,857
MULTI-SIGNAL SAMPLING CIRCUIT
Filed Jan. 31, 1958 3 Sheets-Sheet 2

INVENTORS
WALTER C. JOHNSON
JOHN F. BRINSTER
BY
Ralph K. Bonell
AGENT

INVENTORS
WALTER C. JOHNSON
JOHN F. BRINSTER
BY
*Ralph K. Bonell*
AGENT

United States Patent Office 2,958,857
Patented Nov. 1, 1960

2,958,857

MULTI-SIGNAL SAMPLING CIRCUIT

Walter C. Johnson and John F. Brinster, Princeton, N.J., assignors to General Devices, Inc., Princeton, N.J., a corporation of New Jersey Filed Jan. 31, 1958, Ser. No. 712,576

6 Claims. (Cl. 340—176)

This invention relates to circuits for sampling the electrical signals of a plurality of information channels in rapidly repeated sequence.

Among other applications circuits of the foregoing type find utility in systems of multiplex telemetry such as are employed for the transmission of operating and environmental information of various kinds from a missile or other air-borne vehicle in flight to a ground station. Especially in apparatus of this character the signal sampling means, since it forms a part of the air-borne equipment, must have a minimum weight and occupy as small a space as possible. Ruggedness and simplicity of design, also, are of prime importance. The circuit arrangements of the present invention have advantages over circuits of the prior art in these and other respects. The arrangements disclosed herein are related to other circuit arrangements disclosed in an application for patent filed by the present applicants concurrently herewith, Serial No. 712,575, entitled "Sequential Pulse Generator," now U.S. Patent No. 2,861,202, dated November 18, 1958.

It is an object of the invention to provide improved circuit means for repeatedly sampling variable electrical signals.

Another object of the invention is to provide improved circuit means for sampling in sequence the electrical signals of a plurality of information channels.

Another object is to provide improved sampling circuit means for obtaining a composite output signal comprising a sequence of component signals respectively representative of the information of a plurality of information channels.

Another object is to provide sampling means of the foregoing character in which the occupied space, weight and the number of component parts of the apparatus are minimized.

Another object is to provide sampling means in which normally employed members which are subject to deterioration or instability are eliminated or their number minimized.

The foregoing and other objects and advantages of the invention will be more clearly apparent upon consideration of the following detailed description of exemplary forms of the invention, further illustrated by the accompanying drawings in which.

Figure 1:
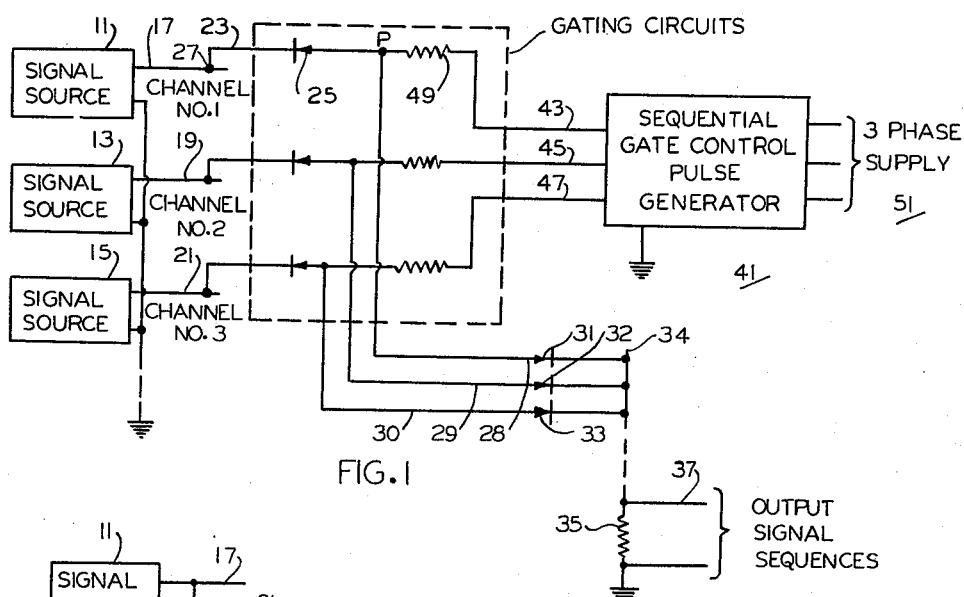
Fig. 1 is a diagram of a circuit in accordance with the principles of the invention, particularly showing the details of one type of gating circuit which may be employed as a component thereof.
Figure 3:
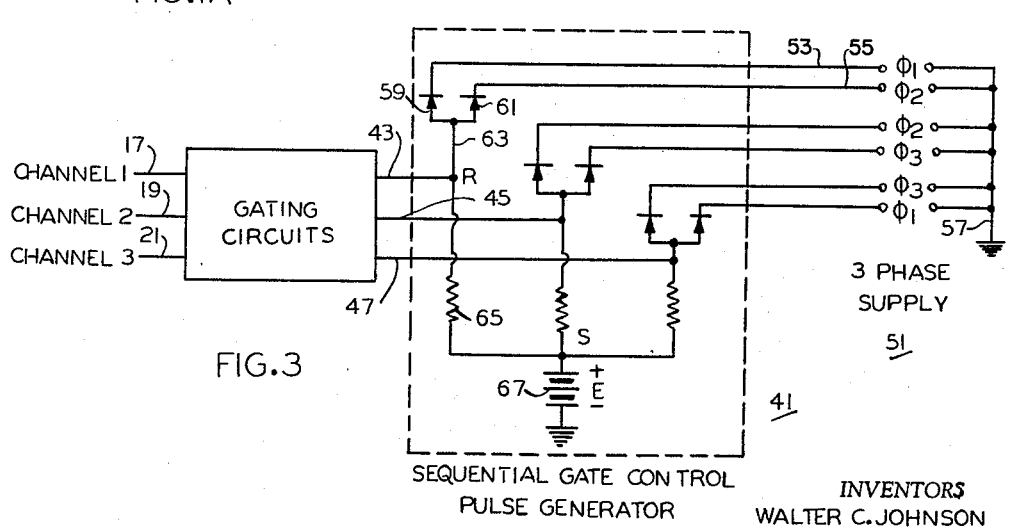
Fig. 3 is another representation of the circuit of Fig. 1, particularly illustrating, as a feature of the invention, the details of a sequential gate control pulse generator.
Figure 4:
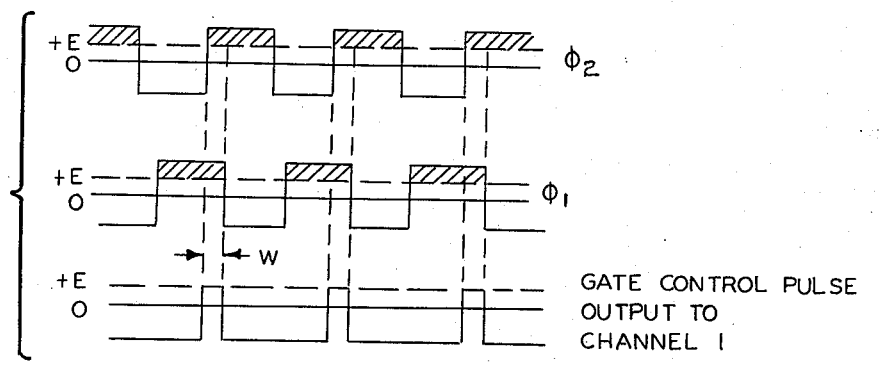
Figure 5:
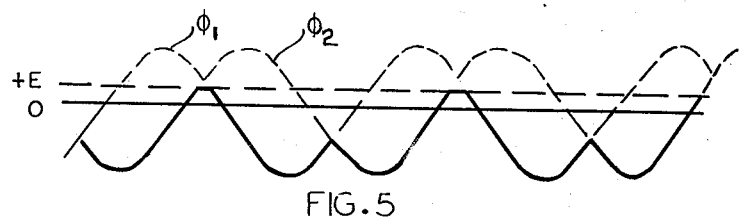
Figure 6:
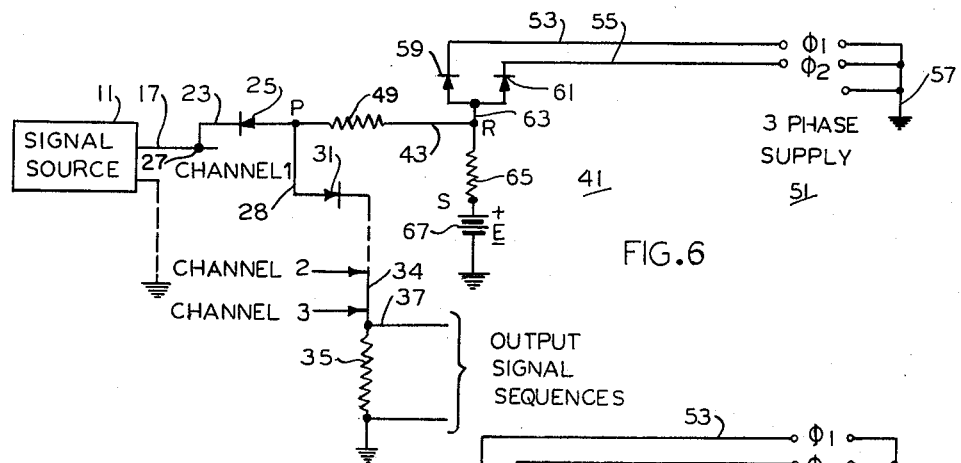
Figure 7:
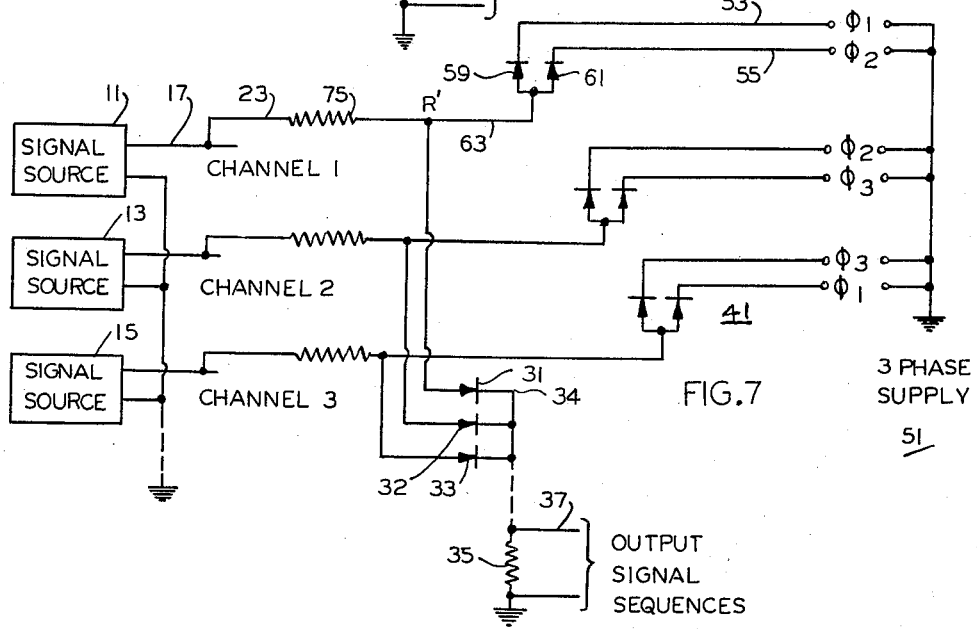

Figs. 4 and 5 each present wave diagrams illustrative of the operation of the pulse generator of Fig. 3;

Fig. 6 is a diagram of the circuit of Figs. 1 and 3 showing in combination the circuit details found separately in the earlier figures, with respect to a single information channel, only;

Fig. 7 is a circuit diagram of a modification of the circuit of Figs. 1, 3 and 6, illustrated in a form adapted for the sampling of three information channel signals.

Figure 9:
Figure 10:
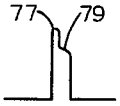
Figure 8:
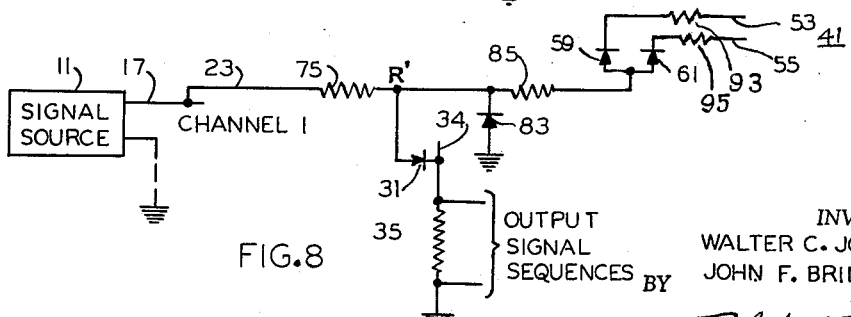

Fig. 8 is a diagram showing a modification of a portion of the circuit of Fig. 7, in single channel form, only;

Fig. 9 is a wave diagram illustrative of the operation of the circuit of Fig. 8; and Fig. 10 is a wave diagram for purposes of explanation.

The invention as a whole comprises mutually cooperative component circuits which respectively have two principal functions:

(1) The generation from an input power supply of recurrent gate control or sampling pulses of a desired type;

(2) The actuation through the agency of these pulses of a series of gates which allow samples of the independently variable signals of a number of information channels to be supplied to an output circuit in predetermined order and in repeated sequences, for their eventual serial transmission over a radio or wire circuit, if desired.

Referring, now, particularly to Figs. 1 and 3, the diagrams of these figures are two representations of the same multi-signal or multi-channel sampling circuit, the former showing in detail the arrangement of the components of the several gating circuits and the latter that of the components of a gate control pulse generator adapted for operation in conjunction therewith.

Information channels No. 1, No. 2 and No. 3, to be sampled repetitively in that order, carry signals supplied by grounded signal sources 11, 13 and 15, respectively, which may be transducers converting pressure, temperature, etc. to electrical form, and the channel circuits comprise high or ungrounded signal leads 17, 19 and 21, respectively. Tracing, by way of example, the connections relating to the gating or sampling of channel No. 1, which are shown in the single channel diagram of Fig. 6 as well as in Fig. 1, lead 17 is connected by sampling lead 23 to one side of diode rectifier 25, preferably a crystal diode but which may be a unidirectional conduction or asymmetrical impedance device of other form, polarized as shown. The junction 27 of leads 17 and 23 may be considered to be a terminal of the input or sampling circuit maintained at signal potential relative to ground. The opposite side of diode 25 is connected to junction point P to which channel output lead 28 also connects. The latter lead further connects to one side of diode rectifier 31, polarized as shown, the opposite side of which is in circuit connection with lead 34, common to the illustrated sampling circuits for three channels. Lead 34 provides a circuit to ground by way of resistor 35 across which the sequences of output sample signals appearing on lead 37 are developed.

The connections thus far described provide the path over which samples of the information signals on channel No. 1 reach the common output circuit when the gate comprising diode 25 is open. Control of this and of the gates for the other channels is exercised by pulses supplied by a sequential gate control pulse generator 41, shown in block form, only, in Fig. 1 and in detail in Fig. 3. Generator 41, to be further described hereinafter, fashions gate control or sampling pulses of suitable shape and duration from what is here shown by way of illustration as a three-phase supply 51. The gate control pulses may equally well be formed from a polyphase supply of a different number of phases. These control pulses appear in the desired sampling sequence on leads 43, 45 and 47, respectively. The No. 1 channel gate control or sampling pulses are seen in full-line form on the middle line of Fig. 2, the pulses for sampling the information signals of the other channels being there indicated in dashed-line form.

The No. 1 channel sampling pulses appearing on lead 43 reach junction point P by way of resistor 49. Due to the position of resistor 49, it is desirable in the circuit, as shown, that the effective impedance of the signal source be low relative to the value of this resistor. The group of signal sources 11, 13, 15 and the generator 41 may be interchanged as to circuit location, however, in which case the impedances of the several sources may be high relative to the effective impedance of generator 41. It will be understood that the effective impedances of the various voltage sources, so far as circuit operation is concerned, may be adjusted by selecting appropriate values of adjacent external series impedances.

Figure 1A:
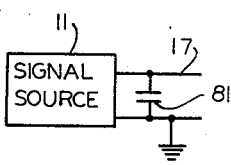
Fig. 1A is a circuit diagram of a modification of a portion of the circuit of Fig. 1.

When the effective impedance of a signal source, as source 11, is relatively high, it may be desirable to employ a shunt capacitor, shown as capacitor 81 in Fig. 1A, across the source output or, looking the other way, across the input of the sampling circuit. This permits the capacitor to be charged to signal potential during the relatively long non-sampling period, for a particular channel, and thereafter to supply the major portion of the current drawn from that channel during the relatively short sampling period, thus avoiding possible distortion of the sample signal due to voltage drop across the source impedance when appreciable current flows therethrough.

Figure 2:
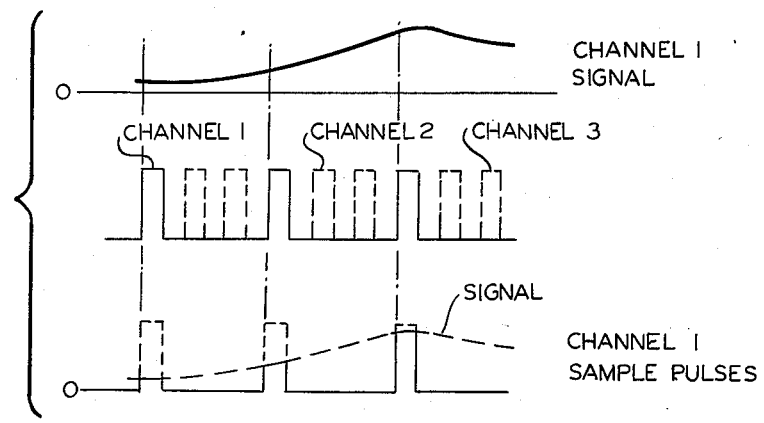
Fig. 2 is a series of wave diagrams illustrative of the operation of the detailed portion of the circuit of Fig. 1.

The operation of the above-described gating or sampling circuit in sampling the signal on channel No. 1, which is the same in the cases of the circuits gating the other channels, may readily be understood from the wave diagrams of Fig. 2. So long as the output of generator 41 on lead 43 is at a lower potential than that of the channel signal on lead 23, including junction point 27 thereof, diode 25 blocks the appearance of this signal in the output circuit. When generator 41 supplies a positive gate control pulse which causes the potential of point P (Fig. 1) to exceed the potential of lead 23, diode 25 is placed in a conducting condition in which it exhibits a low resistance and, therefore, by virtue of this condition and of the polarization of diode 31 in lead 28, substantially the full instantaneous potential of the signal appears on lead 37 and persists there for the duration of the gate control pulse. For a No. 1 channel signal varying as shown on the top line of Fig. 2, the channel sample pulses appear as seen in full-line form on the bottom line of the figure. As illustrated by the diagrams of Fig. 2, the instantaneous potential appearing at point P, the prototype of the channel sample pulse potential, corresponds to whichever of two potentials is the lower, the potential of the channel signal or the potential of the gate control pulse. The special case when these two potentials are instantaneously equal is referred to later herein.

In feeding the sample signals of the three illustrated channels in sequence to a common output circuit, diode rectifiers 31, 32 and 33, by virtue of their polarization, permit only the highest of the potentials simultaneously existing on leads 28, 29 and 30 to appear on lead 34 (provided this is a positive potential), since the diodes to which a lower potential is applied will automatically be biased by any higher level signal on another channel to a non-conducting condition. This highest instantaneous positive potential, in the illustrated case, is always that of the particular channel being sampled. When the potentials of leads 28, 29 and 30 are simultaneously negative relative to ground, that is, relative to the selected zero reference potential, the potential of lead 34 is zero due to the action of rectifiers 31, 32 and 33. This follows since in this case no rectifier is biased to a conducting condition and therefore with no current flow in or voltage drop across resistor 35 the ground at the terminal of this resistor determines the potential of lead 34 and output lead 37.

The circuit of Figs. 1 and 3, and the operation thereof, has been described with respect to the sampling of positive-going signals but it will be apparent that with appropriate changes of polarity, where called for, negative-going signals may, instead, be sampled.

The detailed arrangement of one circuit for gate control pulse generator 41, supplying pulses in the general relationship seen on the middle line of Fig. 2, is shown in Fig. 3, as previously referred to. In the form shown, this generator is arranged to supply sequences of three gate control pulses for actuating the three gates seen in Fig. 1. Pulse generator 41 receives power from three-phase supply 51 having a grounded neutral or common lead 57, the use of a three-phase supply, as before noted, being by way of example, only. Tracing the connections relating to the supply of gate control pulses for sampling the signal of channel No. 1, phase 1 and phase 2 of the supply are connected by leads 53 and 55, respectively, to corresponding sides of diode rectifiers 59 and 61, polarized as shown, the opposite sides of the rectifiers being connected in common to lead 63 and thence to junction point R and a connection to lead 43, the gate control lead of channel No. 1. Lead 63 is in circuit connection with one terminal of resistor 65, the other terminal of which is connected to junction point S to which the positive pole of a negatively grounded battery 67 representing a source of biasing voltage $+E$, also is connected.

The principle of operation of generator 41 in forming the gate control pulses is illustrated by the wave diagrams of Figs. 4 and 5, the former figure demonstrating gate control pulse formation when the supply voltage to the generator is assumed to be of rectangular wave form and distortions of this wave form are neglected, while the latter figure demonstrates the formation of similar pulses in the case of a sinusoidal voltage input. In both cases the waves are assumed to be symmetrical or at least to alternate about zero or ground potential, represented by the base lines of the diagrams. A line of constant potential $+E$, the biasing voltage, also is shown for reference purposes.

Considering, first, the diagrams of Fig. 4, the two top lines of the figure show the wave forms and relative phase displacement (120 degrees) of phase 2 and phase 1 of the supply as applied to leads 55 and 53, respectively. For the formation of a gate control pulse diodes 61 and 59 must be in a non-conducting condition simultaneously. This relationship is illustrated, graphically, in the figure by the overlap, in time, of the shaded areas of the two curves under consideration, these shaded areas of each curve defining the periods during which the supply voltage exceeds the constant bias $+E$. For the duration W of the overlap, therefore, conduction by both diodes 61 and 59 is inhibited and the potential of point R (Fig. 3), with no voltage drop across resistor 65, is that of the applied bias. At other times point R will assume the lower of the potentials of leads 53 and 55 or their common potential if both values are the same. This is so because the diode in a higher potential lead, 55 or 53, will be biased to a non-conducting condition by a lower potential on the other lead. In accordance with the foregoing principle of operation a pulse of peak value $+E$ and width W will appear on gate control lead 43 (serving channel No. 1) once during each cycle of the supply to generator 41, as illustrated on the bottom line of Fig. 4. Similar pulses, displaced in phase, will appear on leads 45 and 47.

For a sinusoidal supply to generator 41, the generation of the gate control pulses for channel No. 1 is illustrated by the diagram of Fig. 5. Here again, as in the case of the rectangular waves of Fig. 4, to form the gate control pulses for this channel the varying voltages of phase 1 and phase 2 of the supply are combined to produce an output pulse once each cycle. This sequence of control pulses is shown as a full-line wave which throughout the figure follows the lower of the potentials of phase 1 and phase 2, with an upper limit of $+E$, as previously explained in connection with Fig. 4. The pulses may be further shaped by conventional means, as desired. It will be noted that in the above-described circuit, regardless of the supply wave form, the peak value of the gate control pulses produced is constant and is determined by the voltage of the biasing source relative to ground. It will be further observed, however, that the peak value of the gate control pulses need not be constant provided it is at least equal to or exceeds the level of the sampled signal at the time sampling is performed. The occurrence of variable amplitude control pulses is the operating condition of a modified circuit later described herein.

Reference has previously been made to the fact that the gate control pulses may be formed from polyphase supplies of any number of phases, that is, by combining any selected number of phase-displaced waves. This feature is further elaborated in earlier cited co-pending application Serial No. 712,575, now U.S. Patent No. 2,861,202. In any such case there will be a diode, corresponding in circuit position to diode 61 in phase 2, which defines the leading edges of the generated gate control pulses for each channel and a diode, corresponding to diode 59 in phase 1, which defines the trailing edges. It is desirable that the former diode have the property usually characterized as "fast recovery" while the latter diode should have high forward conductivity. Fast recovery tends to minimize or entirely avoids a leading edge overshoot or spike, such as is shown at point 77 of the gate control pulse illustrated in Fig. 10, while high forward conductivity tends to minimize a rounding of the pulse at the start of the trailing edge, such as is shown at point 79.

It is seen in Fig. 3 that the various phases of supply 51 are combined in pairs and in cyclical phase sequence to produce the sequence of gate control pulses seen on the middle line of Fig. 2.

For convenience in tracing the complete circuit of Figs. 1 and 3, Fig. 6, as noted, shows in detail both the gate and gate control pulse generator arrangements for a single channel sampling circuit, incorporating the circuit elements separately shown in Figs. 1 and 3.

Fig. 7 shows a modification of the circuit of Figs. 1, 3 and 6 permitting a reduction in the number of circuit components relative thereto. This has among other advantages further weight and space reduction and less possibility of deterioration of the sampling apparatus. Upon comparison of Fig. 7 with Figs. 1, 3 and 6 it will be found that the gating diodes, of which diode 25 is an example, are absent in the former figure; also, that the source of bias voltage illustrated as battery 67 has been eliminated. This is possible by allowing the sampled channel signal itself, instead of a separately applied bias, to determine the peak value of the gate control pulse, as will be further explained. In this figure resistor 75 corresponds to resistor 49 of the preceding figures.

An analysis of the circuit of Fig. 7 will show that the potential of point R', corresponding to point R in Fig. 3, follows the lower of the two potentials respectively furnished by phase 1 and phase 2 of the supply 51, as does that of point R in Fig. 3, except that in the case of Fig. 7 the peak value to which the potential of point R' rises is not uniform, as when determined by a constant voltage biasing source, but, by virtue of the polarization of diodes 59 and 61, is substantially the instantaneous signal value appearing on lead 23, including point 27 thereof. Here, then, instead of the gate control pulse exceeding, in general, the sampled signal in peak value during the sampling period, as illustrated on the bottom line of Fig. 2, there is the equally satisfactory operating condition that the peak values of gate control pulse and signal are substantially the same. The bottom line of Fig. 2 can serve as an illustration of this condition, as well as of the previously discussed one, if the dashed portions of the gate control pulses above the signal wave are considered to be eliminated, the representations of control pulse and sample signal then appearing as coincident, one with the other.

A modification of the circuit of Fig. 7 (also applicable in principle to that of Figs. 1, 3 and 6) is shown in Fig. 8. This comprises the addition of a diode 83, connected to a source of reference potential, here illustrated as zero or ground potential, together with an associated resistor 85 either alone or in combination with resistors 93 and 95 in leads 53 and 55, respectively. These circuit elements have the following functions:

(1) To constitute a clamp eliminating, in this case, the negative portions of the generated gate control pulses; and (2) To serve as a means for preventing pulse current, furnished by generator 41, from flowing in the several signal sources, 11, 13 etc.

By clamping the output of generator 41 to ground in a manner to eliminate negative portions of the output wave, the form of this wave which incorporates the individual gate control pulses, is as seen in Fig. 9, where channel No. 1 pulses, only, are shown (not to scale). The peak amplitudes of the individual pulses are controlled by and vary in proportion to the existing values of the channel signal. If a similar clamp is used in connection with the circuit of Fig. 3, the constant bias +E applied in that circuit would result in pulses of constant peak amplitude, as pointed out in the earlier explanation of the operation of that circuit. By eliminating the negative portion of the output of generator 41, diode 31 (and the other diodes corresponding thereto) is relieved from having to withstand a reverse voltage of possibly a hundred volts or more and can be particularly specified to be of a type having a high forward conductivity, this latter property not always being compatible with an ability to withstand a high reverse voltage. With a high forward conductivity for this diode, substantially the full and undistorted potential of point R', which varies directly with the channel signal potential, appears on output leads 34 and 37 during the sampling period.

By providing an effective ground connection for pulse current at the output of generator 41, diode 83 furnishes a short circuit path for pulse current supplied by generator 41 from grounded supply 51, as seen in Fig. 8, which otherwise would find its return ground connection by traversing signal source 11, to the detriment of accurate signal sampling. Resistor 85, and resistors 93 and 95, if used, serve to limit the amplitude of this diverted current. Circuit considerations not discussed herein determine the distribution of resistance between resistor 85 and resistors 93 and 95 or the omission of either.

While not shown in the circuit diagrams of Figs. 7 and 8, it is to be understood that signal source shunt capacitors, as capacitor 81 of Fig. 1A, may be employed to offset the adverse effect of relatively high signal source impedance, the value of their capacity being determined, relative to co-acting resistances, by the time constants involved. As to resistors 49 and 65, with types of commercially available diodes that have been employed, these, by way of example, may have values of the order of 20,000 to 50,000 ohms. If desirable, amplification by conventional means (not illustrated) may be employed in any of the described circuits.

As the invention disclosed herein may be embodied in a wide variety of circuits, those described herein in all cases are to be considered to be by way of illustration, only, and not by way of limitation.

What is claimed is:

1. In apparatus for periodically sampling the value of a variable electrical signal the combination of, a source of a variable signal, input circuit means connected to said source to maintain a terminal of said circuit means at signal potential relative to a reference potential, a pair of unidirectional conduction devices each having an input and an output terminal as determined by forward current flow therethrough, a voltage supply furnishing two periodic voltages of like periodicity in relatively displaced relationship, said voltages alternating about said reference potential, circuit means for applying said voltages to a pair of terminals of like character of said unidirectional devices, respectively, intermediate circuit means connecting the other terminals of said devices in common to said input circuit means terminal including an impedance serially connected between said other terminals and said input circuit means terminal, further circuit means comprising passive circuit elements only and including a series combination of a third unidirectional conduction device and an impedance connected between a point of said intermediate circuit means and a source of said reference potential, and an output circuit connected to receive a voltage developed across said last impedance.

2. The combination defined in claim 1 wherein said pair of unidirectional conduction devices is constituted by a pair of crystal diodes of diverse characteristics, one of said diodes being particularly characterized by a fast recovery time and the other by a low forward resistance, each relative to the other.

3. In apparatus for periodically sampling the value of a variable electrical signal the combination of, input circuit means adapted for connection to a source of the sampled signal to maintain a terminal of said means at signal potential relative to a reference potential, a pair of unidirectional conduction devices each having an input and an output terminal as determined by forward current flow therethrough, a voltage supply furnishing two periodic voltages of like periodicity in relatively displaced phase relationship, said voltages alternating about said reference potential, circuit means applying said voltages to a pair of terminals of like character of said unidirectional devices, respectively, intermediate circuit means connecting the other terminals of said devices in common to said input circuit terminal including a pair of resistors serially connected therebetween and means unidirectionally connecting a point intermediate said resistors to a source of said reference potential, and output circuit means comprising a pair of leads connected to said intermediate circuit means intermediate said resistors and to a source of said reference potential, respectively.

4. In apparatus for periodically sampling the several values of a plurality of variable electrical signals in selected sequence the combination of, a plurality of sources of variable signals, a plurality of input circuit means equal in number to the signals to be sampled and adapted for the respective connection thereof to selected ones of said signal sources thereby to maintain a terminal of each input circuit means at the potential of one of the signals relative to a reference potential, a like plurality of pairs of unidirectional conduction devices each having an input and an output terminal as determined by forward current flow therethrough, a voltage supply furnishing a plurality of periodic voltages of like periodicity in relatively displaced time relationship, said voltages alternating about said reference potential, circuit means for applying a different pair of said voltages to terminals of like character in each of said pairs of unidirectional devices, respectively, individual intermediate circuit means including a series impedance connecting the other terminals in each of said pairs of devices in common to one of said input circuit means, terminals, a common output circuit including an impedance having one terminal thereof directly connected to a source of said reference potential, individual connections from a point of each of said intermediate circuit means lying intermediate said series impedance therein and the commonly connected other terminals of said unidirectional conductive devices to the other terminal of said output circuit impedance, said last named connections each including a unidirectional conductive device, and circuit means receiving a voltage developed across said output circuit impedance.

5. In apparatus for periodically sampling the value of a variable electrical signal the combination of input circuit means adapted for connection to a source of a variable signal potential to maintain a terminal of said input circuit means at said signal potential relative to a reference potential, a pair of unidirectional conduction devices each having an input and an output terminal as determined by forward current flow therethrough, a voltage supply furnishing two periodic voltages of like periodicity in relatively displaced time relationship, said voltages alternating about said reference potential, circuit means for applying said voltages to a pair of terminals of like character of said unidirectional conduction devices, respectively, intermediate circuit means connecting the other terminals of said devices in common to said input circuit means terminal including an impedance serially connected between said other terminals and said input circuit means terminal, further circuit means comprising passive circuit elements, only, and including a third unidirectional conduction device having one terminal thereof connected to said intermediate circuit means at a point intermediate said serially connected impedance therein and said pair of unidirectional conduction devices together with an impedance directly connected between a source of said refrence potential and the other terminal of said third unidirectional conduction device, and an output circuit connected to receive a voltage developed across said last-named impedance.

6. In apparatus for periodically sampling the several values of a plurality of variable electrical signals in selected sequence the combination of individual input circuit means adapted for connection to sources of said signals to maintain a terminal of each of said input circuit means at signal potential relative to a reference potential, pairs of unidirectional conduction devices equal in number to said input circuit means, each device having an input and an output terminal as determined by forward current flow therethrough, voltage supplies furnishing periodic voltages of like periodicity in relatively displaced time relationship to terminals of like character of said devices in each of said pairs thereof, said voltages alternating about said reference potential, individual intermediate circuit means connecting the other terminals of the devices in each of said pairs thereof in common to one of said input circuit means terminals including therein a pair of resistors serially connected in circuit and means unidirectionally connecting a point intermediate said resistors to a source of said reference potential, further circuit means connected to each of said intermediate circuit means at said point intermediate said pair of resistors therein each including a unidirectional conduction device, said several further circuit means as a group comprising a common impedance having one terminal thereof directly connected to a source of said reference potential, and means for utilizing a voltage developed across said last impedance.

References Cited in the file of this patent

UNITED STATES PATENTS

| 2,146,862 | Shumard | Feb. 14, 1939 |
| 2,688,661 | Van Mierlo | Sept. 7, 1954 |
| 2,792,525 | McArdle | May 14, 1957 |

FOREIGN PATENTS

| 128,537 | Australia | July 28, 1948 |
| 711,053 | Great Britain | June 23, 1954 |

OTHER REFERENCES

Electrical Engineering, vol. 1, Issue 12, December 1952, Typical Block Diagrams for a Transistor Digital Computor, pp. 1103 and 1104.